United States Patent [19]

Grantz

[11] Patent Number: 5,513,351

[45] Date of Patent: Apr. 30, 1996

[54] PROTECTING A SYSTEM DURING SYSTEM MAINTENANCE BY USAGE OF TEMPORARY FILENAMES IN AN ALIAS TABLE

[75] Inventor: Jeffrey A. Grantz, Boca Raton, Fla.

[73] Assignee: International Business Machines Corporation, Armonk, N.Y.

[21] Appl. No.: 281,721

[22] Filed: Jul. 28, 1994

[51] Int. Cl.$^6$ .................................................. G06F 17/30
[52] U.S. Cl. ........................... 395/600; 395/650; 395/700; 364/283.1; 364/962.4; 364/DIG. 1; 364/DIG. 2
[58] Field of Search ..................................... 395/600, 650, 395/700

[56] References Cited

U.S. PATENT DOCUMENTS 4,399,504  8/1983  Obermarck et al. .
4,400,773  8/1983  Brown et al. .

(List continued on next page.)

FOREIGN PATENT DOCUMENTS 254854A  2/1988  European Pat. Off. .
278312A  8/1988  European Pat. Off. .

(List continued on next page.)

OTHER PUBLICATIONS

Tim Parker, *Data Based Advisor*, "Moving FoxBASE+From DOS To Xenix (Converting DOS FoxBASE+Programs to SCO FoxBASE+)", vol. 7, No. 10, Oct. 1989, pp. 124–128.

Jeffrey Richter, *Microsoft Systems Journal*, "Streamline Your Program's Setup Wiyh The Version Control and Decompression DLLs". (Dynamic Link Libraries), vol. 7, No. 6, Oct. 1992, pp. 61–71.

Bigelow, W. S., *User–Friendly, Portable Input Interface For Use with Evolving Simulation Computer Codes*, in IEEE Conference Record—Abstracts. 1989 IEEE International Conference on Plasma Science, Cat No. 89CH2760–7, pp. 154, O REF., Buffalo, NY, USA, 22–24 May, 1989.

Stokel, K. J., *How To Audit Program Library Control Software*, EDPACS (USA), vol. 7, No. 11, pp. 1–10, May 1980, O REF.

Ananthanarayanan, R., et al., *Application Specific Coherence Control For High Performance Distributed Shared Memory*, Symposium on Experiences with Distributed and Multiprocessor Systems, Newport Beach, CA, USA, 26–27 Mar., 1992, pp. 109–128, 21 REF.

Russo, V. G., *Object–Oriented Operating System*, Univ. of Illinois at Urbana–Champaign, IL, USA, Rpt. No. UIUCDCS-R-91-1640, Jan. 1991, 129 REF.

Symonds, A. J., et al., *How Will We Achieve True Integration?*, Fourth International Workshop on Computer–Aided Software Engineering, Irvine, CA, USA 5–8 Dec., 1990,

(List continued on next page.)

*Primary Examiner*—Thomas G. Black
*Assistant Examiner*—Paul R. Lintz
*Attorney, Agent, or Firm*—Ray Strimaitis; Keith L. Hargrove; Andrew J. Dillon

[57] ABSTRACT

A method of maintaining functional compatibility after performing system maintenance on a computer during system operation is described. The method starts when there is a request to perform system maintenance by determining if a directory holding a set of files to be maintenanced has adequate space for a set of new files. The system maintenance typically occurs when the operating system is to be replaced by a new operating system or upgraded with an improved version of the current operating system. Next, the system, in response to there being adequate space to for the new set of files, places the new set of files in the directory. Each file within the new set of files is given a new name within the directory. Each file in the set of old files in the directory is then renamed with a temporary name. The new names of the new set of files are then placed in an alias table for access by any other files open on the computer during maintenance. In response to a file request for one of new files with a new name in the alias table, the system accesses one of the old files with a temporary name instead of the request for the new file, thus preserving system integrity and compatibility during the system maintenance.

12 Claims, 4 Drawing Sheets

U.S. PATENT DOCUMENTS

| | | |
|---|---|---|
| 4,480,304 | 10/1984 | Carr et al. . |
| 4,486,834 | 12/1984 | Kobayashi et al. . |
| 4,695,946 | 9/1987 | Andreasen et al. . |
| 4,701,845 | 10/1987 | Andreasen et al. . |
| 5,012,409 | 4/1991 | Fletcher et al. . |
| 5,032,979 | 7/1991 | Hecht et al. . |
| 5,079,695 | 1/1992 | Dysart et al. . |
| 5,113,500 | 5/1992 | Talbott et al. . |
| 5,113,522 | 5/1992 | Dinwiddie, Jr. et al. . |
| 5,140,685 | 8/1992 | Sipple et al. . |
| 5,155,809 | 10/1992 | Baker et al. . |
| 5,233,611 | 8/1993 | Triantafyllos et al. . |
| 5,237,677 | 8/1993 | Hirosawa et al. . |
| 5,247,677 | 9/1993 | Welland et al. . |
| 5,253,359 | 10/1993 | Spix et al. . |
| 5,274,808 | 12/1993 | Miyao et al. ............................ 395/650 |
| 5,295,260 | 3/1994 | Pribnow . |
| 5,303,379 | 4/1994 | Khoyi et al. . |
| 5,381,545 | 1/1995 | Baker et al. ............................ 395/575 |

FOREIGN PATENT DOCUMENTS

| | | |
|---|---|---|
| 332148A | 9/1989 | European Pat. Off. . |
| 336552A | 10/1989 | European Pat. Off. . |
| 362107A | 4/1990 | European Pat. Off. . |
| 470880A | 2/1992 | European Pat. Off. . |
| 515073A2 | 11/1992 | European Pat. Off. . |
| 547991A2 | 6/1993 | European Pat. Off. . |
| 550368A2 | 7/1993 | European Pat. Off. . |
| 04287209 | 10/1912 | Japan . |
| 04237343 | 8/1925 | Japan . |
| 58-058626 | 4/1983 | Japan . |
| 59-185458 | 10/1984 | Japan . |
| 60-140450 | 7/1985 | Japan . |
| 60-187385 | 9/1985 | Japan . |
| 61-160126 | 7/1986 | Japan . |
| 61-235925 | 10/1986 | Japan . |
| 62-180637 | 8/1987 | Japan . |
| 01297007 | 11/1989 | Japan . |
| 01301445 | 12/1989 | Japan . |
| 01312658 | 12/1989 | Japan . |
| 02087794 | 3/1990 | Japan . |
| 02180494 | 7/1990 | Japan . |
| 02205933 | 8/1990 | Japan . |
| 03233730 | 10/1991 | Japan . |
| 04052826 | 2/1992 | Japan . |
| 04253232 | 9/1992 | Japan . |
| 04331549 | 11/1992 | Japan . |
| 05034753 | 2/1993 | Japan . |
| WO9012375A | 10/1990 | WIPO . |
| WO9013084A | 11/1990 | WIPO . |
| WO9104540A | 4/1991 | WIPO . |

OTHER PUBLICATIONS

Advance Working Papers, Cat. No. 90CH2956–1, IEEEE, *Comput. Soc. Press*, pp. 168–172, 1990, O REF.

Le Moan, S., et al., *Digital Transmission Network Management System Capabilities and Result of a Large Implementation*, Conference Proceedings: Communication Systems: Towards Global Integration. Singapore ICCS 1990, Singapore, 5–9, Nov. 1990, Elsevier, pp. 17–3/1–5 vol. 2, 1990, O REF.

Singer, C. P., *Modelling Contention Sensing Memory Management Systems: A VAX/VMS Case Study*, Conference Proceedings: Seventh International Conference on Mathematical and Computer Modelling, Chicago, IL, USA, 2–5 Aug. 1989, *Math. Comput. Model.* (UK), vol. 14, pp. 184–189, 1990, 11 REF.

Egorov, S. S., et al., *A System With–Open OS Architecture In A Network*, Avtom. Vychisl. Tekh. (USSR), vol. 21, No. 4, pp. 55–60, 1987, 18 REF. (Taken from : *Autom. Control Comput. Sic.* (USA), vol. 21, No. 4, pp. 47–52, 1987).

Maier, H. H., et al., *Software Tools For Supporting Project Management*, Conference Proceedings: Heidelberg, West Germany, 14–16 May, 1986, Siemens AG, Muenchen––Perlach, West Germany; IFAC, Pergamon, Oxford, UK, pp. 141–152, 1987, 5 REF.

Little, J. H., et al., *Prototype Real–Time Simulation Software For the Concurrent Multiprocessing Environment*, Conference Proceedings: Fort Worth, TX, USA, 13–16 Oct., 1986, Boeing Comput. Services Co., Seattle WA, USA; IEEE, New York, USA, pp. 209–211, 1986, O REF.

Hindin, H. J., *Two is Better Than One (Coresident Operating Systems)*, *Comput. Des.* (USA), vol. 25, No. 7, pp. 49–64, 1 Apr. 1986, O REF.

Houtekamer, G., et al., *Performance Analysis of the IBM DASD Subsystem, and Some Suggestions for Improved Systems*, Measurment, Modelling and Evaluation of Computer Systems, 3rd GI/NTG Technical Meeting Dortmund, Germany, 1–3 Oct. 1985, Springer–Verlag, Berlin, Germany, pp. 261–276, 1985, 10 REF.

Elbert, M., *Structural Method for Analyzing Maintainability*, Conference Proceedings: 10th Annual Engineering Conference on RAM for the Electric Power Industry, Montreal, Que., Canada, 25–27 May, 1983, IEEE, New York, USA, pp. 204–209, 1983 8 REF.

Suzuki, Y., et al., *New Maintenance and Operating Systems and Future Trends for Transmission Network Maintenance Work, Jpn. Telecommun. Rev.* (Japan), vol. 25, No. 2, pp. 107–112, Apr. 1983, O REF.

Tolchin, S. G., et al., *A Prototype Generalized Network Technology For Hospitals: Initial Implementation*, Conference Proceedings: Fifteenth Hawaii International Conference on System Sciences, 1982, Honolulu, HI, USA, 6–8 Jan., 1982, vol. 2, pp. 591–600, 1982, 23 REF.

Lyhne, P., et al., *A Highly Reliable Operating System For A Text And Data Switching System*, Conference Proceedings: Fifth European Conference on Electrotechnics–EUROCON '82, Copenhagen, Denmark, 14–18 Jun., 1982, *Reliability in Electrical and Electronic Components and Systems*, North––Holland, Amsterdam, Netherlands, pp. 645–649, 1982, 5 REF.

Orton, R. L., et al., *Operations and Maintenance Facilities Provided by ARE 11 Telecommun. J. Aust.* (Australia), vol. 30, No. 1, pp. 12–19, 1980 O REF.

Baumann, R., et al., *Design of Distributed Multiprocessor Operating Systems, Comput. Ind.* (Netherlands), vol. 1, No. 2, pp. 117–121, Dec. 1979, O REF.

*Record of the Symposium on Automatic Support Systems For Advanced Maintainability*, St. Louis, MO., USA, 19–21, Oct., 1970 IEEE, New York, USA, 1970.

Lausen, G., et al., *On the Power of Safe Locking, J. Comput. Syste, Sci.* (USA), vol. 40, No. 2, pp. 269–288, Apr., 1990, 12 REF.

Jordan, H. F., *Experience With Pipelined Multiple Instruction Streams*, Proc. IEEE (USA), vol. 72, No. 1, pp. 113–123, Jan. 1984, 35 REF.

Potier, D., et al., *Analysis of Locking Policies In Database Management Systems*, Proceeings: Performance 80. 7th IFIP W.G.7.3 International Symposium on Computer Performance Modelling, Measurement and Evaluation, Toronto, Ontario, Canada, 28–30 May 1980, *Performance Eval. Ref.* (USA), vol. 9, No. 2, p. 255, Summer 1980, O REF.

Gajski, D. D., *Design of Arithmetic Elements For Burroughs*

*Scientific Processor,* Proceedings of the 4th Symposium on Computer Arithmetic, Santa Monica, CA, USA, 25–27 Oct. 1978, IEEE, New York, USA, pp. 245–256, 1978, 8 REF.

Cook, J. A., et al., *Graphics Adapter Programming Interface with Separable Device Drivers, IBM Technical Disclosure Bulletin,* vol. 36 No. 12, Dec. 1993, pp. 169–171.

Corn, V. E., et al., *Transparently Separating Functions from a Large Dynamic Link Library, IBM Technical Disclosure Bulletin,* vol. 36 No. 10, Oct. 1993, pp. 475–476.

Benefield, K. R., et al., *Bimodal Applications Without Family Application Program Interface, IBM Technical Disclosure Bulletin,* vol. 34 No. 3, Aug. 1991, pp. 404–407.

Nagin, K., et al., *New Lock Acquistion Policy, IBM Technical Disclosure Bulletin,* vol. 34 No. 12, May 1992, pp. 314–318.

Bredin, F., et al., *Enhanced Switching Controlled Nor Decoder Circuit, IBM Technical Disclosure Bulletin,* vol. 33 No. 10A, Mar. 1991, pp. 131–133.

Yuval, A., *Scan—A Contention Monitor for Operating Systems, IBM Technical Disclosure Bulletin,* vol. 22 No. 7, Dec. 1979, pp. 3029–3031.

PROTECTING A SYSTEM DURING SYSTEM MAINTENANCE BY USAGE OF TEMPORARY FILENAMES IN AN ALIAS TABLE

BACKGROUND OF THE INVENTION

1. Technical Field

The present invention relates generally to maintenance of computer systems, and, more particular to performing maintenance on the operating system while the operating system runs locked executables or dynamic libraries, or other types of programmed features.

2. Description of the Related Art

Operating systems are well known in the art. During operation, computer operating systems often lock executables, dynamic subroutine libraries, or data files, or any combination of the three, to protect them while the computer system is running. Sometimes, it is necessary to do maintenance on those files while the computer system is running and it is desirable to minimize any impact to the production system. This is so since separate executables often have interdependencies that can change when a new maintenance level has been completely installed. For example, when a new operating system is installed or a old operating system is upgraded to a new and improved version, this system maintenance can lead to incompatibilities. If only some of the new modules are placed on a system, the system may fail due to these incompatibilities. For example, an inconsistent system can be created using the DOS Replace Module API in OS/2. If the system runs out of swapper space during a set of replacements, some modules will have been replaced and others that needed replacement will not have had the chance to be replaced.

Accordingly, what is needed is a method for dynamic subroutine libraries updating the operating system that has loaded or locked files or executables, or while minimizing failure due to incompatibility or inconsistencies.

SUMMARY OF THE INVENTION

It is therefore one object of the present invention to provide a stable operating system for a computer system.

It is another object of the present invention to provide system compatibility and consistency during maintenance of the operating system.

The foregoing objects are achieved as is now described. According to the present invention, a method of maintaining functional integrity during and after performing system maintenance during system operation is described. The system operation typically occurs on a data processing apparatus, such as a computer. The method starts when there is a request to perform system maintenance by determining if a memory drive has adequate space for a set of new files. The system maintenance typically occurs when the operating system is to be replaced by a new operating system or upgraded with an improved version of the current operating system. Next, the system, in response to there being adequate space for the new set of files, places the new set of files on the drive. Each file within the new set of files is given a new name. Each file in the set of old files is renamed with a temporary name. The new names of the new set of files is then placed in an alias table for access by any other files open on the computer during maintenance. In response to a file request for one of new files with a new name in the alias table, the system accesses one of the old files with a temporary name instead of the request for the new file, thus preserving system integrity and compatibility during the system maintenance.

The method further facilitates system integrity by atomically generating a list of files in a directory. Later, the system allows for the alias table to be cleansed or removed to eliminate all the old files with their temporary names, following which, the system renames each of the new files with its original name.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
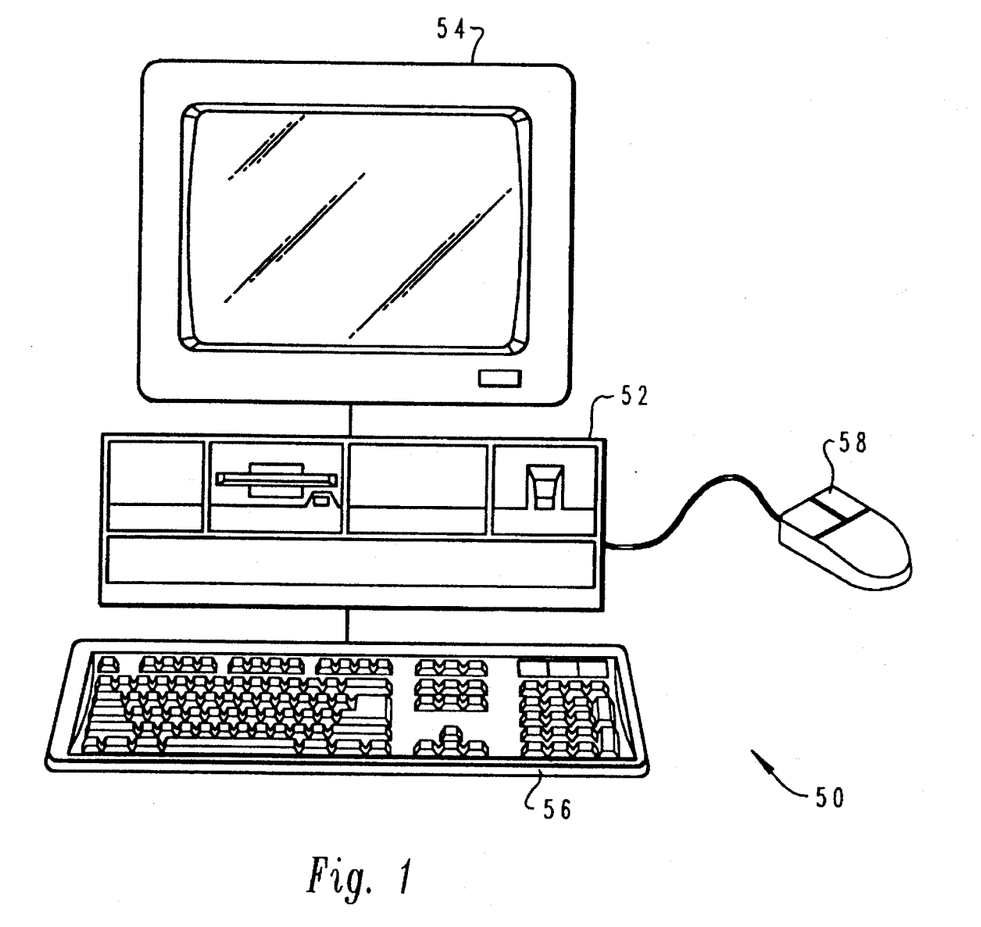
FIG. 1 is a pictorial representation of a data processing system that may be utilized to implement a method and system of the present invention.

With reference now to the figures and in particular with reference to FIG. 1, there is depicted a pictorial representation of a data processing system in which the present invention may be implemented in accordance with a preferred embodiment of the present invention. A personal computer 50 is depicted which includes a system unit 52, a video display terminal 54, a keyboard 56, and a mouse 58. Personal computer 50 may be implemented utilizing any suitable computer such as an IBM PS/2 computer, a product of International Business Machines Corporation, located in Armonk, N.Y. "PS/2" is a registered trademark of International Business Machines Corporation, located in Armonk, N.Y. Although the depicted embodiment involves a personal computer, a preferred embodiment of the present invention may be implemented in other types of data processing systems, such as for example, intelligent work stations or mini-computers.

Figure 2:
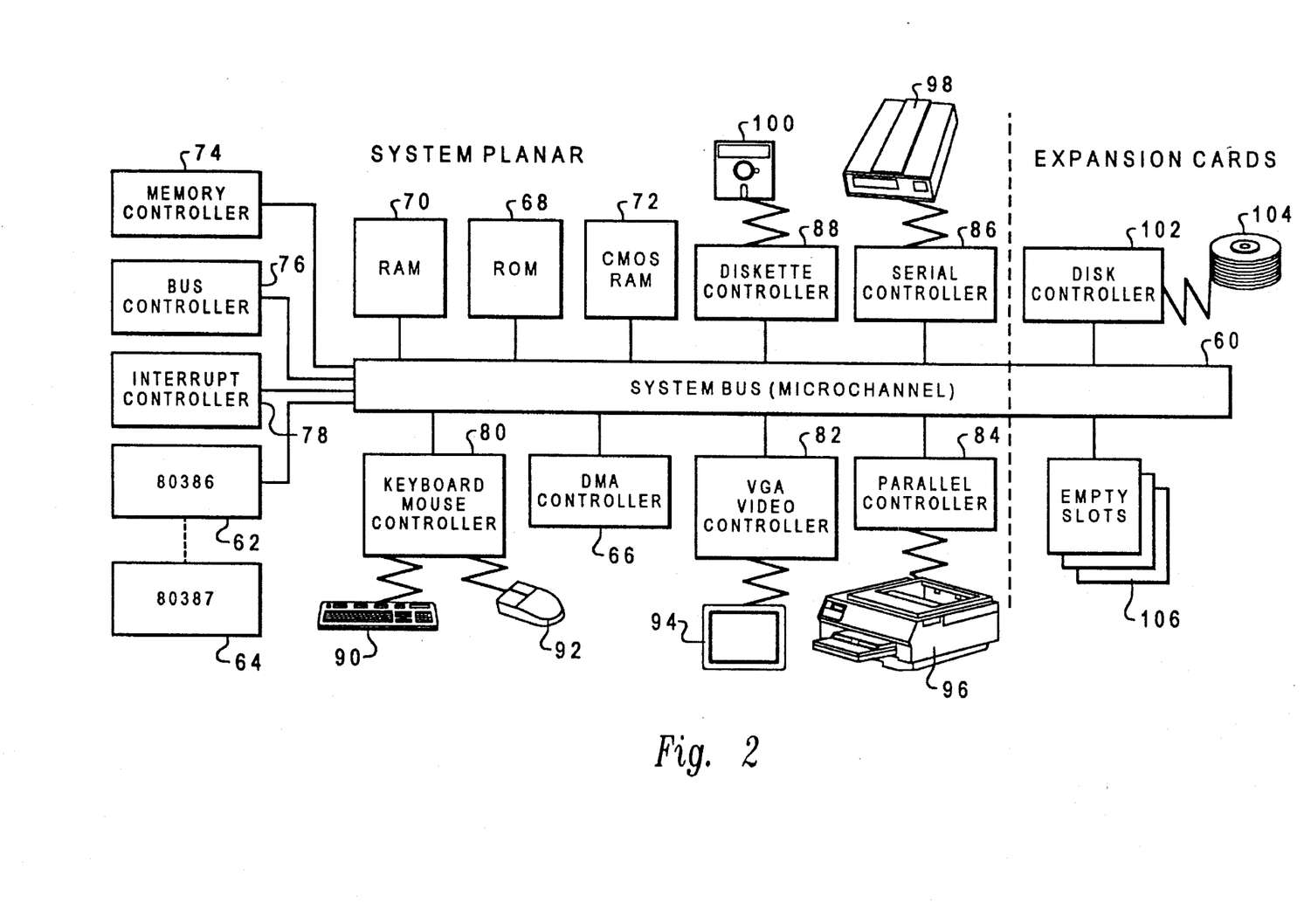
FIG. 2 depicts a block diagram of selected components in the data processing system illustrated in FIG. 1 in which a preferred embodiment of the present invention may be implemented.

Referring now to FIG. 2, there is depicted a block diagram of selected components in personal computer 50 in which a preferred embodiment of the present invention may be implemented. System unit 52 preferably includes a system bus 60 for interconnecting and establishing communication between various components in system unit 52. Microprocessor 62 is connected to system bus 60 and also may have numeric coprocessor 64 connected to it. System bus 60 may be a Micro Channel system bus from International Business Machines Corporation. "Micro Channel" is a registered trademark of International Business Machines Corporation. Direct memory access (DMA) controller 66 is also connected to system bus 60 and allows various devices to appropriate cycles from microprocessor 62 during large I/O transfers.

Read Only Memory (ROM) 68 and Random Access Memory (RAM) 70 are also connected to system bus 60. ROM 68 contains the power-on self test (POST) and the Basic Input/Output System (BIOS) which control hardware operations, such as those involving disk drives and the keyboard. Read only memory (ROM) 68 is mapped into the microprocessor 62 address space in the range from 640K to 1 megabyte. CMOS RAM 72 is attached to system bus 60 and contains system configuration information.

Also connected to system bus 60 are memory controller 74, bus controller 76, and interrupt controller 78 which serve to aid in the control of data flow through system bus 60 between various peripherals, adapters, and devices. System unit 52 also contains various input/output (I/O) controllers such as: keyboard and mouse controller 80, video controller 82, parallel controller 84, serial controller 86, and diskette controller 88. Keyboard and mouse controller 80 provide a hardware interface for keyboard 90 and mouse 92. Video controller 82 provides a hardware interface for video display terminal 94. Parallel controller 84 provides a hardware interface for devices such as printer 96. Serial controller 86 provides a hardware interface for devices such as a modem 98. Diskette controller 88 provides a hardware interface for floppy disk unit 100. Expansion cards also may be added to system bus 60, such as disk controller 102, which provides a hardware interface for hard disk unit 104. Empty slots 106 are provided so that other peripherals, adapters, and devices may be added to system unit 52.

Those skilled in the art will appreciate that the hardware depicted in FIG. 2 may vary for specific applications. For example, other peripheral devices such as: optical disk media, audio adapters, or chip programming devices such as a PAL or EPROM programming device, and the like also may be utilized in addition to or in place of the hardware already depicted.

Figure 3:
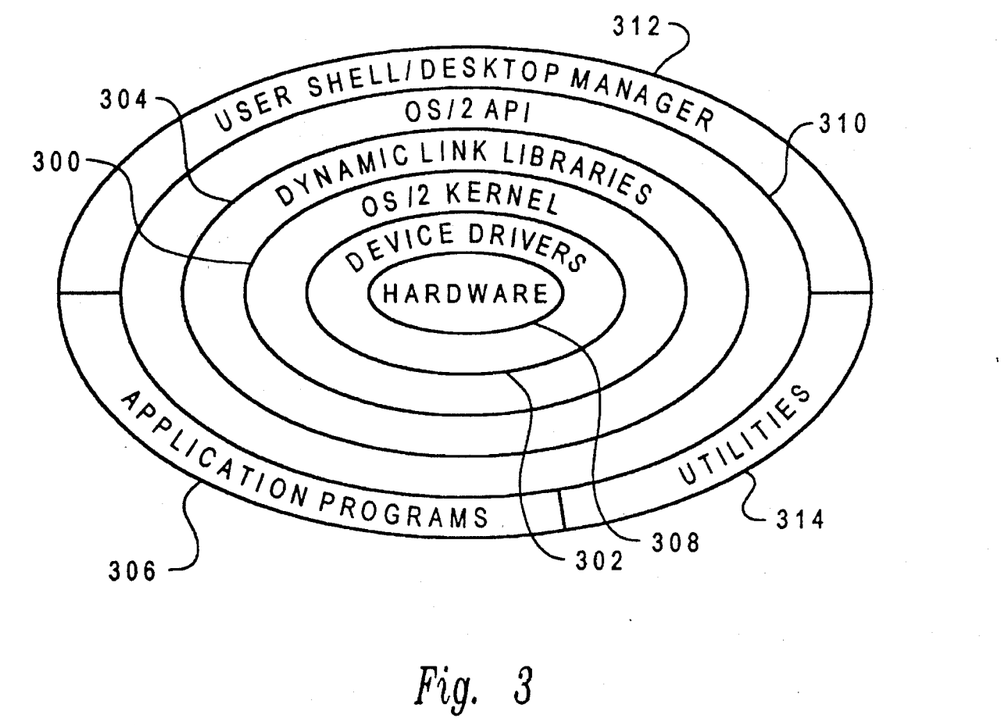
FIG. 3 depicts a block diagram of the system hierarchy used in the computer depicted in FIG. 1.

One type of operating system contemplated is the OS/2 operating system developed by IBM. FIG. 3 illustrates the hierarchical structure of the OS/2 system, which is comprised of the kernel 300, device drivers 302, dynamic link libraries 304, and application programs 306.

The kernel 300 is the heart of the system; it contains the control program that runs with supervisor privileges. The kernel 300 uses device drivers to access the system's hardware 308 resources. The kernel 300 also provides multitasking, memory management, interprocess communication, DOS compatibility and I/O. Many of the system's APIs are located in the kernel 300 link, but some APIs are located in dynamic link libraries, which are shared libraries 310 that can be used to extend the functionality of the system. Additional elements of the operating system include a user shell/desktop manager 313 and utilities program 314.

Figure 4:
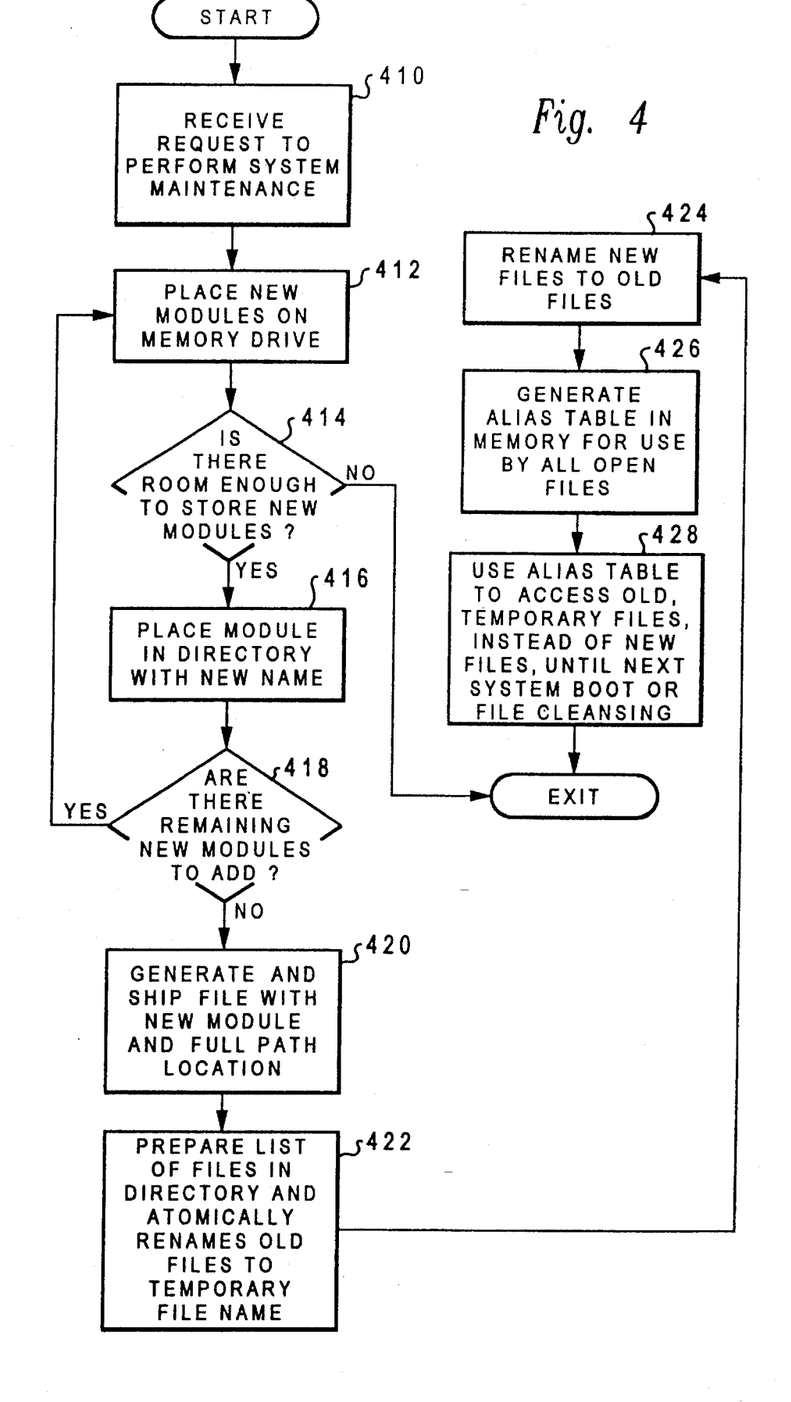
FIG. 4 is a flowchart depicting the maintenance procedure according to the present invention.

FIG. 4 depicts a flow chart during a given maintenance procedure, such as when the operating system is upgraded. The state of the computer system is typically when locked files or executables have been loaded or other type functions are operating in the system. To begin, an operating system maintenance request is received in step 410. Upon receipt of the request, the maintenance procedure, in step 412, places all the new modules in the same location as the old module, but with a different name. If, in step 414, there is not enough room for all the files to be copied to the drive, the system does not update according to this method and then exits or aborts the maintenance procedure. For example, a given file XYZ.EXE must be replaced in the directory ABCD. The procedure places the new module in the ABCD directory with the file name XYZ.NEW, as shown in step 416. All the other modules are placed in the same directory in a similar manner by repeating step 416, if other modules exist according to step 418. Next, in step 420, the maintenance procedure generates or ships a file with the full path location to the new file, ABCD\XYZ.NEW, the associated name of the original file being replaced, ABCD\XYZ.EXE, with a generated temporary name not currently in that directory, ABCD\XYZ.TMP.

Next, in step 422, the system uses a new API in the file system that takes the above list and atomically renames the old files to the temporary file names. Then, in step 424, the system renames the new files to the old file names and, then, in step 426, generates an alias table in memory that all file OPENs then use. The process of atomically renaming the old and new files and creating an alias table means all the function is done as one item in one instance, before anything else is begun or performed.

This set of renames allows the currently open files to continue to work correctly without problems of reallocation. For example, if the file name being looked at is in the alias list, file OPEN returns the information on the old, temporary module, but not the new module (step 428). The alias table is located in memory and is used while the system is still running. At the next boot, soft or hard, the system is then at the new level and the alias table is gone. The system then provides the operator the option of cleaning up the old files or reverting back to the prior system if desired.

This method is applicable to any operating system, besides the OS/2 system, upon which maintenance is to be performed while the operating system is functioning and yet keep the system safe and compatible while working.

While the invention has been particularly shown and described with reference to a preferred embodiment, it will be understood by those skilled in the art that various changes in form and detail may be made therein without departing from the spirit and scope of the invention.

I claim:

1. A method of maintaining functional integrity during and after performing system maintenance on an existing set of originally named files during system operation on a data processing system, the steps comprising:

(a) responsive to a request to perform system maintenance placing any new file on a memory drive in said data processing system said new file intending to replace one of said set of existing files;

(b) giving said new file a new name;

(c) renaming said existing file to be maintenanced with a temporary name;

(d) placing new name of said new file in an alias table;

(f) responsive to a file request of one of said new files with a new name in said alias table, accessing one of said existing files with a temporary name instead of said one of said new files with a new name.

2. A method according to claim 1 wherein said step (c) of renaming said files further comprises the step of using a new API to process a list of files.

3. A method according to claim 1 wherein said step (c) of renaming said files is done atomically.

4. A method according to claim 1 further comprising the step of (g) cleansing said alias table of said files with said temporary names.

5. A method according to claim 4 wherein said step of (g) cleansing said alias table is performed in response to a request to remove said files with said temporary names.

6. A method according to claim 4 further comprising the step of renaming said new files with their original names.

7. A method of maintaining functional integrity during and after performing system maintenance during system operation on a data processing system, the steps comprising:
   (a) responsive to request to perform system maintenance, determining if a memory drive in said data processing system has adequate space for a set of new files;
   (b) responsive to there being adequate space to for said set of new files, placing said set of new files on said memory device;
   (c) giving each file within said set of new files a new name;
   (d) renaming each file within said set of files to be maintenanced with a temporary name;
   (e) placing said new names of said set of new files in an alias table;
   (f) responsive to a file request of one of said new names of one of said set of new files in said alias table, accessing one of said set of files to be maintenanced with a temporary name instead of said one of said new files with a new name.

8. A method according to claim 7 wherein said step (d) of renaming each file further comprises the step of using a new API to process a list of files.

9. A method according to claim 7 wherein said step (d) of renaming each file is done atomically.

10. A method according to claim 7 further comprising the step of cleansing said alias table of said set of files with said temporary names.

11. A method according to claim 10 wherein said step of cleansing said alias table is performed in response to a request to remove said set of files with said temporary names.

12. A method according to claim 10 further comprising the step of renaming each of said set of new files with its original name.

* * * * *

UNITED STATES PATENT AND TRADEMARK OFFICE
CERTIFICATE OF CORRECTION

PATENT NO.　：　5,513,351
DATED　　　：　April 30, 1996
INVENTOR(S)：　Grantz

It is certified that error appears in the above-indentified patent and that said Letters Patent is hereby corrected as shown below:

Column 4, line 53: insert --(e) repeating steps (a) through (d) for each new file;--

Signed and Sealed this

Thirteenth Day of August, 1996

Attest:

BRUCE LEHMAN

*Attesting Officer*　　　　*Commissioner of Patents and Trademarks*